No. 846,156. PATENTED MAR. 5, 1907.
W. M. STAMPS.
CULTIVATOR.
APPLICATION FILED JULY 25, 1906.

2 SHEETS—SHEET 1.

Witnesses
Inventor
By William M. Stamps
John S. Duffie Attorney

No. 846,156. PATENTED MAR. 5, 1907.
W. M. STAMPS.
CULTIVATOR.
APPLICATION FILED JULY 25, 1906.

2 SHEETS—SHEET 2.

WITNESSES:
F. L. Ourand
J. P. Duffie

INVENTOR.
William M. Stamps
BY John S. Duffie
Attorney

UNITED STATES PATENT OFFICE.

WILLIAM MORELAND STAMPS, OF NEWNAN, GEORGIA.

CULTIVATOR.

No. 846,156.   Specification of Letters Patent.   Patented March 5, 1907.

Application filed July 25, 1906. Serial No. 327,680.

*To all whom it may concern:*

Be it known that I, WILLIAM MORELAND STAMPS, a citizen of the United States, residing at Newnan, in the county of Coweta and State of Georgia, have invented certain new and useful Improvements in Cultivators, of which the following is a specification.

My invention has relation to new and useful improvements in cultivators of that class that employ vertically-adjustable disk or rectangular fenders in connection with two gangs of plow-points adjustably secured to the cultivator and adapted to throw back the dirt removed by the fenders.

While my invention is especially designed and primarily intended for the cultivation of cotton, it may be used for the cultivation of other crops.

My invention consists in the novel construction, combination, and arrangement of parts, as set forth in the specification and the claims hereunto appended.

Figure 1:
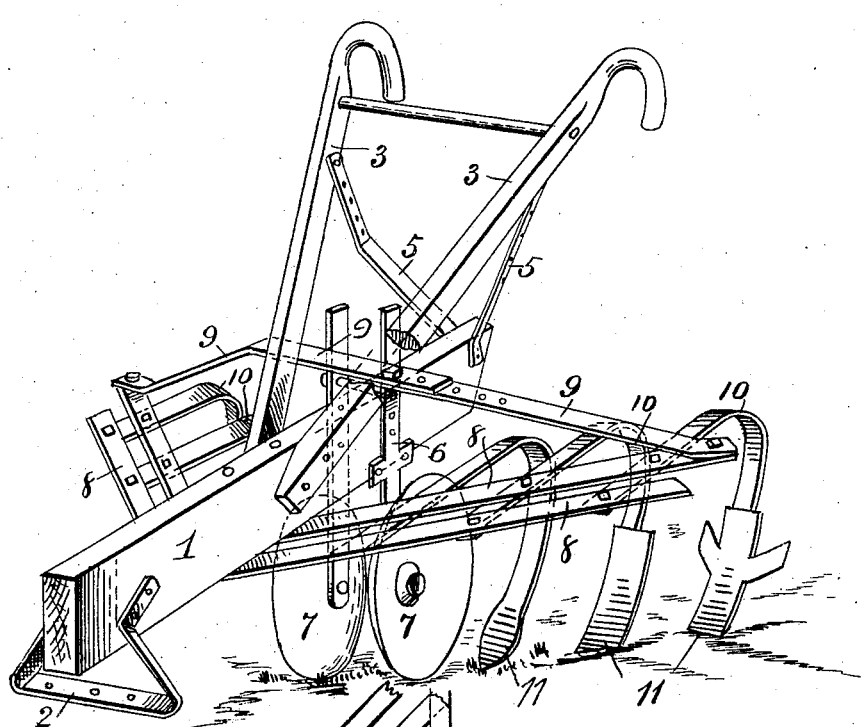
Figure 2:
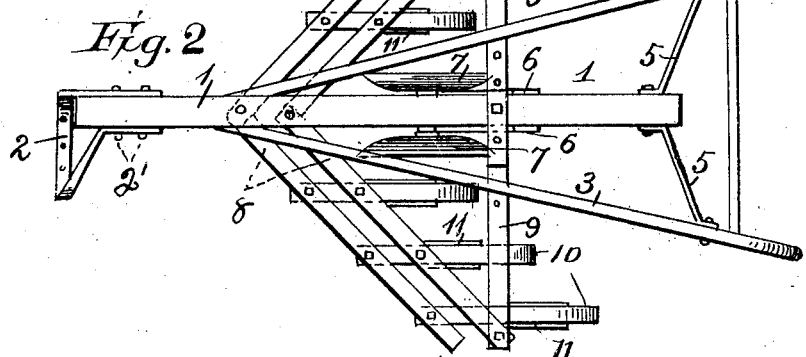
Figure 3:
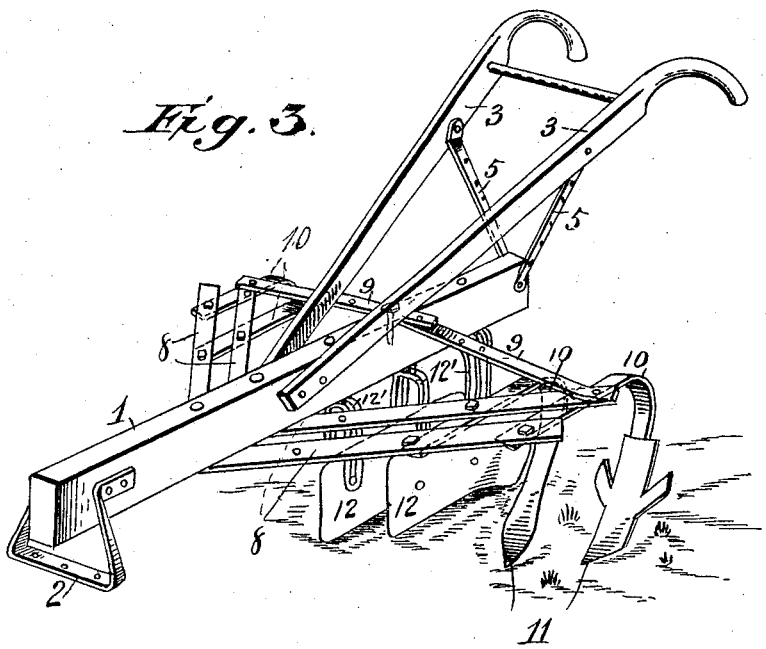
Figure 4:
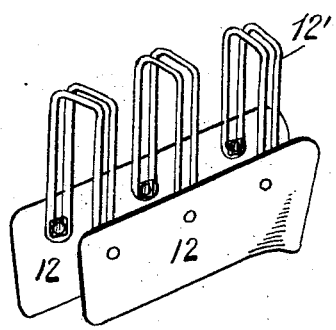

In the accompanying drawings, in which like parts are designated by like characters throughout the several views, Figure 1 is a perspective view of my invention when I employ disk fenders. Fig. 2 is a top plan view of Fig. 1. Fig. 3 is a perspective view of my invention when the fenders are flat and of rectangular form. Fig. 4 is a detail perspective view of my invention, showing the means for adjustably securing the fenders to the draft-beam of the cultivator when said fenders are made flat and in rectangular form.

My invention is described as follows: In carrying out my invention I employ a central draft-beam 1, having its front end provided with a clevis 2. Said clevis is of such construction that it extends considerably farther on one side of the draft-beam than on the other to permit the swingletree to be so attached thereto that the horse or team drawing the cultivator will not walk directly over the row, and thus beat down the small crops being cultivated. Said clevis is removably and reversibly attached to said draft-beam by means of bolts and nuts or other equivalent means, so that when reversed the horse or team may walk on the other side of the row. Pivoted at their front ends to the outer sides of said draft-beam 1 intermediate of its length are the front ends of plow-handles 3. Rigidly secured at their lower ends to the sides of said draft-beam near its extreme outer end and adjustably secured to the inner sides of said handles at their upper ends are angular bars 5, provided each with a series of transverse perforations in its upper end. Said handles may be raised or lowered to suit the convenience of the operator by proper adjustment of the said handles to said angular bars. Adjustably secured to the outer sides of said draft-beam near its rear end, immediately opposite each other, are two adjustable standards 6, each provided with a series of transverse perforations in its upper end, and journaled to the lower or free ends of said vertical adjusting-standards are disk fenders 7, having concave and convex surfaces. Pivoted at their extreme front ends to the under side of said draft-beam 1 near its front end, two on either side of said beam in parallel opposition, are frame-bars 8, and secured at their extreme outer ends to the extreme rear ends of the innermost of said frame-bars are transverse shifting bars 9, provided each with a series of vertical perforations in its free or inner end. Pivoted at their front ends to each of said frame-bars 8 on each side of the draft-beam 1 of my cultivator are the drag-bars 10 of plow-points 11. My cultivator is provided with two gangs of plow-points, one on either side of the draft-beam, and while each gang preferably consists of three plow-points it may have more or less, as occasion necessitates. Each gang of plow-points may be shifted laterally by drawing the inner ends of said transverse adjusting-bars 9 inward or outward until the perforations in said ends register, when a bolt and nut or other equivalent means may be employed to hold them in position.

Sometimes instead of using disk fenders 7 in connection with my invention I employ flat and preferably rectangular oblong fenders 12, in which case I dispense with the adjustable standards 6 and employ in lieu thereof inverted-U-shaped adjusting members 12', consisting each of two inverted corresponding U-shaped rods or wires connected at their lower ends by a loop. Said inverted-U-shaped adjusting members are connected at their tops to the under faces of said draft-beam 1 near its rear end and are adjustably secured at their lower or free ends by bolts and nuts or other equivalent means to the inner faces of said fenders 12'. Said fenders 12 may be vertically adjusted by slipping the bolts thereof up or down between the corresponding inverted-U-shaped wires or rods of the inverted-U-shaped adjusting members 13 and tightening the nuts.

Having described my invention, what I claim as new, and desire to secure by Letters Patent, is—

1. In a cultivator having handles and a clevis, the combination of a draft-beam; inverted-U-shaped members, consisting each of two inverted corresponding U-shaped rods, secured at their top ends to the under face of said draft-beam; substantially rectangular fenders secured to said U-shaped members; frame-bars, pivoted at their front ends to the under side of said draft-beam, two on each side of said beam, the bars on each side of the beam being independently adjustable; gangs of drag-bars, pivoted at their front ends to the under side of said frame-bars, and plow-points secured to the free ends of said drag-bars, and adapted to be shifted laterally by means of said adjustable bars, substantially as shown and described and for the purposes set forth.

2. The combination of the draft-beam 1; the inverted-U-shaped adjustable members 12′, secured at their upper ends to said draft-beam; fenders 12, adjustably secured to said U-shaped members; frame-bars 8, pivoted at their front ends to the under side of said draft-beam, two on each side thereof; independent means for adjusting the frame-bars on each side of the beam, and a gang of drag-bars on each side of said draft-beam; and pivoted at their front ends to the under side of said frame-bars and adapted to be shifted laterally therewith, and a clevis reversibly secured to the draft-beam substantially as shown and described and for the purposes set forth.

3. The combination of the draft-beam; the reversible clevis, secured to the front end thereof, having one side extending further out from one side of said draft-beam than the other; fenders, adjustably secured to said draft-beam; frame-bars, pivoted at their front ends to the under side of said draft-beam, two on each side thereof; means for adjusting the frame-bars on each side of the beam independently, and a gang of drag-bars on each side of said draft-beam, pivoted at their front ends to the under side of said frame-bars, adjustable therewith and carrying plow-points, substantially as shown and described and for the purposes set forth.

In testimony whereof I have signed my name to this specification in the presence of two subscribing witnesses.

WILLIAM MORELAND STAMPS.

Witnesses:
 OREN W. PASSAVANT,
 NICHOLAS E. POWEL.